United States Patent [19]

Cannan

[11] Patent Number: 4,840,779

[45] Date of Patent: Jun. 20, 1989

[54] CRYSTALLINE ZEOLITE LZ-202 AND PROCESS FOR PREPARING SAME

[75] Inventor: Thomas R. Cannan, Valley Cottage, N.Y.

[73] Assignee: UOP, Des Plains, Ill.

[21] Appl. No.: 752,555

[22] Filed: Jul. 8, 1985

[51] Int. Cl.[4] .................. C01B 33/28; C01G 23/047
[52] U.S. Cl. .................. 423/328; 423/118; 423/610; 502/85
[58] Field of Search .............. 423/329, 328, 118; 502/66, 77, 85

[56] References Cited

U.S. PATENT DOCUMENTS

| | | | |
|---|---|---|---|
| 3,947,482 | 3/1976 | Albers et al. | 423/328 |
| 4,018,870 | 4/1977 | Whittam | 423/329 |
| 4,021,447 | 5/1977 | Rubin et al. | 423/328 |
| 4,175,114 | 11/1979 | Plank et al. | 423/329 |
| 4,241,036 | 12/1980 | Flanigen et al. | 423/328 |
| 4,275,047 | 6/1981 | Whittam | 423/329 |
| 4,331,643 | 5/1982 | Rubin et al. | 423/329 |
| 4,377,502 | 3/1983 | Klotz | 423/328 |
| 4,503,023 | 3/1985 | Breck et al. | 423/328 |
| 4,544,539 | 10/1985 | Wortel | 423/329 |
| 4,552,731 | 11/1985 | Vaughan | 423/328 |
| 4,554,146 | 11/1985 | Vaughan | 423/328 |

FOREIGN PATENT DOCUMENTS

| | | | |
|---|---|---|---|
| 0094288 | 11/1983 | European Pat. Off. | 423/328 |
| 0127399 | 12/1984 | European Pat. Off. | 502/77 |
| 0205674 | 1/1984 | Fed. Rep. of Germany | 423/328 |
| 1125190 | 11/1984 | U.S.S.R. | 423/328 |
| 1117568 | 6/1968 | United Kingdom . | |
| 1178186 | 1/1970 | United Kingdom . | |
| 1365318 | 8/1974 | United Kingdom . | |

OTHER PUBLICATIONS

W. M. Meier and D. H. Olson, *Atlas of Zeolite Structure Types*, published by the Structure Commission of the International Zeolite Association, 1978, I.S.B.N.: 0-9601830-0-0, pp. 5-99 (the entire volume).

*Primary Examiner*—John Doll
*Assistant Examiner*—R. Bruce Breneman
*Attorney, Agent, or Firm*—Richard G. Miller

[57] ABSTRACT

The crystalline omega-type zeolite LZ-202 can be prepared by a novel process that eliminates the prior art requirement of a templating agent. Unlike prior art omega-type zeolites, the as-synthesized form is totally ion-exchangeable and can be enriched with silicon by treatment with ammonium fluorosilicate to produce a product which is substantially crystalline.

50 Claims, No Drawings

CRYSTALLINE ZEOLITE LZ-202 AND PROCESS FOR PREPARING SAME

FIELD OF THE INVENTION

This invention relates in general to omega-type crystalline zeolites molecular sieves and a novel method of preparing them. More particularly it relates to an omega-type zeolite which is prepared without the use of a templating agent and which is therefore totally ion exchangeable without calcination.

BACKGROUND OF THE INVENTION

Aluminosilicate omega-type zeolitic molecular sieves have a composition generally expressed in terms of mole ratios of oxides as follows:

$$1.0 \pm 0.5 M_{2/n}O : Al_2O_3 : 3-20 SiO_2 : 0-20 H_2O$$

wherein M is at least one cation in oxidation state n. Their structure is a framework of gmelinite cages in two networks of non-intersecting channels—a series of main channels formed of 12-sided rings that run parallel to the c axis of the unit cell; and a series of secondary channels in the a-b plane that are inaccessible to the main channels. These materials exhibit characteristic X-ray diffraction patterns and may be useful as adsorbents and catalysts.

The most common and best characterized omega-type zeolites are zeolite omega and zeolite ZSM-4. Both are prepared from alkaline alumina-silica mixtures containing templating agents. As detailed in U.S. Pat. No. 4,241,036 the favored template for zeolite omega is an alkylammonium cation, preferably tetramethylammonium (TMA) cation. For ZSM-4 several templating agents have been reported, including TMA salts (British Pat. No. 1,297,256), other alkylammonium salts (British Pat. No. 1,365,318), pyrrolidine and chlorine salts (U.S. Pat. No. 4,021,447), diazobicyclooctane and triethylenediamine (U.S. Pat. No. 4,331,643) and various oxygen-containing and oxygen-nitrogen-containing organic compounds (U.S. Pat. No. 4,377,502). Ion-exchange of the as-synthesized or template-containing zeolite is incomplete. Only the metal ions contained in the main channels can be removed in the manner. The template cations are trapped in the gmelinite cages and can only be removed by vigorous methods such as calcination and oxidation. When the oxidized or calcined form is exchanged with ammonium ion and then treated with ammonium fluorosilicate (AFS) to replace zeolitic aluminum with silicon according to the method described in U.S. Pat. No. 4,503,023, the product retains no more than 30% crystallinity.

The principal object of this invention is the preparation of an omega-type zeolite without the use of a templating agent. It is a further object to prepare an omega-type zeolite which is totally ion-exchangeable in its as-synthesized, uncalcined form. It is an additional object to provide a novel omega-type zeolite, LZ-202, which, when treated with fluorosilicate salts, is converted to a substantially crystalline, silicon-enriched zeolitic material.

DETAILED DESCRIPTION OF THE INVENTION

The present invention is directed in part to an uncalcined crystalline omega-type synthetic zeolitic molecular sieve, denominated LZ-202, (a) whose stoichiometric composition expressed in moles of oxides is $$1.0 \pm 0.5 M_{2/n}O : Al_2O_3 : xSiO_2 : yH_2O$$

wherein M represents at least one hydrogen, ammonium, alkali metal, alkaline earth metal, transition metal or rare earth lanthanide metal cation in oxidation state n, has a value of from about 3 to about 20, and y has a value of from about zero to about 20; (b) whose X-ray diffraction pattern is essentially as set forth in Table A; and (c) whose fluorosilicate substitution product is more crystalline than that prepared from a calcined or oxidized omega-type zeolite synthesized used a template cation. The transition metal ions are those elements having atomic numbers from 21 through 30, from 39 through 48 and from 72 through 80. The lanthanide or rare earths are those elements with atomic numbers from 57 through 71.

In a preferred embodiment of zeolite LZ-202 x has a value of from about 5 to about 10, y has a value of from zero to about 10, and M is selected from the group consisting of hydrogen, ammonium, sodium and potassium.

TABLE A

X-Ray Diffraction Pattern for Omega-Type Zeolites

| d(A) | Relative Intensity |
| --- | --- |
| 15.54 | M |
| 9.06 | VS |
| 7.83 | M |
| 6.81 | MS |
| 5.93 | M |
| 4.68 | M |
| 3.79 | MS |
| 3.70 | M |
| 3.61 | M |
| 3.51 | S |
| 3.15 | S |
| 3.08 | M |
| 3.02 | M |
| 2.91 | S |

The principal lines in the X-ray diffraction pattern of the zeolite prepared by the process of this invention are characteristic of omega-type zeolites and are shown in Table A. This pattern can be obtained with either standard techniques or computer-based techniques using a Siemens D-500 X-ray powder diffractometer. In the standard technique the K-alpha doublet of copper is the radiation source and peaks are detected with a scintillation counter, analyzed with a pulse height analyzer and recorded with a strip chart pen recorder. The peak intensities, I, and the peak positions as a function of twice theta, where theta is the Bragg angle, are read from the spectrometer chart. From these the relative intensities, $100 \, I/I_o$, where $I_o$, is the intensity of the strongest line peak, and d(A); the interplanar spacing in Angrstom units corresponding to the recorded lines, are determined. The more significant interplanar spacings that characterize omega-type zeolites and distinguish them from other zeolites are shown in Table A. The relative intensities are described as VS (very strong), S (strong), MS (medium strong) and M (medium). The intensities and positions of the X-ray lines may vary because of certain effects, such as humidity, temperature and apparatus used, which would be familiar to one skilled in the art of X-ray crystallography. Because the X-ray pattern depends upon the aluminosilicate framework, this pattern is characteristic of omega-type zeolites in a variety of ion-exchanged forms such as those containing hydrogen, ammonium, alkaline earth, alkali metal, transition metal and rare earth metal ions.

Zeolite LZ-202 can be differentiated from other omega-type zeolites in two ways. The as-synthesized zeolites omega and ZSM-4 cannot be totally ion-exchanged because the large organic cations contained in those zeolites cannot be removed by ion-exchange techniques. Only after calcination or oxidative destruction of those cations can complete ion-exchange be accomplished by methods well known in the art, for example, see U.S. Pat. No. 4,241,036. In contrast, zeolite LZ-202 readily and completely ion-exchanges in its as-synthesized form because the charge sites in the cages and pores predominantly occupied by easily exchanged sodium cations.

The second basis for differentiation lies in the extent of crystallinity of the fluorosilicate substitution products that are formed by treating the various template-free omega-type zeolites with a fluorosilicate salt. As used herein a "fluorosilicate substitution product" is a silicon-enriched omega-type zeolite that forms when an omega-type precursor is treated with a flourosilicate salt by the following procedure: 1. ion-exchange to convert the zeolite to its ammonium form; and 2. digestion at an appropriate pH, usually between about 3 and about 7, in the presence of an ammonium, alkali metal or alkaline earth fluorosilicate salt at 75°–95° C. (see U.S. Pat. No. 4,503,023 incorporated herein by reference.) The inability of the as-synthesized zeolites omega and ZSM-4 to be totally ammonium-exchanged because of the trapped template cations prevents silicon-for-aluminum exchange from occurring in the gmelinite cages of those zeolites. In contrat, their calcined or oxidatively treated forms can be converted completely and quite easily to their ammonium forms. However, when the ammonium-exchanged products are treated with ammonium fluorosilicate (AFS), $(NH_4)_2SiF_6$, at 75° C., they are substantially inert to reaction, and at 99° C. they are converted to materials that are largely amorphous; crystallinity of the products has not exceeded 30% when compared to calcined, then ammonium-exchanged zeolite omega that has not been treated with AFS in this manner.

The substitution of silicon for aluminum in the aluminosilicate framework of zeolite LX-202 is, on the other hand, straightforward according to the recommended standard procedure. A slurry of the ammonium form of the zeolite in water (0.3–3 g of zeolite crystals/50 cc deionized water) is heated to 75° C. To this slurry is added a solution of containing 0.3–1.0 g AFS in 50 cc water; the weight ratio of AFS/zeolite should be within the range of about 0.2–0.4. This solution should be added in 2 ml aliquots every 2–3 minutes. Once the addition is complete the resulting slurry is digested for one to five hours at 95° C. The crystalline product is washed with deionized water until the effluent is free of fluoride ion. The characteristics of the precursor ammonium LZ-202 and the silicon enriched product are shown in Table B. The X-ray diffraction pattern of the crystalline silicon-enriched product prepared by this procedure is shown in Table C. Approximately 36% of the aluminum in the original omega-type zeolite has been replaced by silicon to give a stable crystalline silicon-enriched aluminosilicate. The crystallinity of the product exceeds 30%, and is usually at least 75% crystalline as determined by X-ray diffraction. Crystallinity is calculated as the ratio of the sums of the areas of all peaks found in the X-ray diffraction patterns of both the silicon-enriched product (Table C) and of the ammonium-exchanged standards of either zeolite LZ-202 or calcined zeolite omega (Table A).

TABLE B

Properties of $NH_4$—LZ-202 and the Product of AFS Treatment

| Property | $NH_4$—LZ-202 | ASF-Treated LZ-202[1] | ASF-Treated TMA-Omega[2] |
|---|---|---|---|
| $H_2O$ (%) | 19.7 | 17.8 | — |
| $(NH_4)_2O$ (%) | 7.1 | 4.5 | 7.93 |
| $Na_2O$ (%) | 0.22 | 0.17 | 0.16 |
| $SiO_2$ (%) | 63.3 | 70.0 | 72.30 |
| $Al_2O_3$ (%) | 17.4 | 11.2 | — |
| $SiO_2/Al_2O_3$* | 6.18 | 10.60 | 6.67 |
| % Crystal | 100 | 75–85 | 30 |

[1] Reaction conditions: 2g $NH_4$—LZ-202/50 cc $H_2O$; 0.7g AFS/50cc $H_2O$
[2] Reaction conditions: 5g $NH_4$—TMA-Omega/100 cc $H_2O$; 1.48g AFS/50cc $H_2O$ (U.S. Pat. No. 4,503,023)
*Molar Ratio

TABLE C

X-Ray Diffraction Pattern of Silicon-Enriched Zeolite LZ-202

| d(A) | Relative Intensity |
|---|---|
| 15.7 | 14.7 |
| 9.15 | 100.0 |
| 7.92 | 45.3 |
| 6.84 | 51.1 |
| 5.97 | 54.5 |
| 5.50 | 19.8 |
| 4.70 | 21.9 |
| 4.38 | 20.6 |
| 3.94 | 18.4 |
| 3.80 | 75.1 |
| 3.70 | 32.7 |
| 3.62 | 20.5 |
| 3.51 | 64.3 |
| 3.42 | 24.6 |
| 3.16 | 47.8 |
| 3.08 | 26.7 |
| 3.04 | 21.0 |
| 2.98 | 10.0 |
| 2.92 | 50.1 |

This invention is also directed to a template-free method of preparing zeolite LZ-202 which comprises: (a) combining, with sufficient agitation to maintain a slurry, (i) an aqueous solution of an aluminum salt containing the anion of a strong acid, and (ii) an aqueous solution of MOH, wherein M is an alkali metal, of sufficient concentration and in a molar amount sufficient to neutralize the aluminum salt; (b) blending with the slurry of step (a) a metal-silica source containing silica in a molar amount that is about 5 to about 30 times that of alumina and containing alkali metal in a molar amount that is about 1 to about 12 times that of alumina; and (c) digesting the mixture of step b at a temperature and for a time sufficient to produce a crystalline material having an X-ray diffraction pattern essentially as set forth in Table A. To reduce reaction times and enhance yields, it is preferred that the final molar ratios of silica:alumina and alkali metal oxide:alumina be lower, about 6 to about 10 and about 1.5 to about 4 respectively. Especially preferred are the ranges of about 8.0 to about 8.2 for silica:alumina and 2.4 to 2.7 for alkali metal oxide:alumina. For these ratios of silica:alumina and alkali metal oxide:alumina, the ratio of water:alumina may range from 50 to 1000 but it is preferred that this ratio range from about 100 to about 200; especially preferred is a range of about 150 to about 170.

In a preferred embodiment the preparation of zeolite LZ-202 begins by adding an aqueous solution of Al$_2$(SO$_4$)$_3$ to a vigorously stirred solution of sodium hydroxide containing 6.0±0.4 moles of NaOH for each mole of Al$_2$(SO$_4$)$_3$ added, according to the following equation.

$$Al_2(SO_4)_3 + 6NaOH \rightarrow Al_2O_3 + 3Na_2SO_4 + 3H_2O$$

While not wanting to be bound by any particular mechanistic theory, it is my belief that by maintaining an excess of hydroxide during the combining process and limiting the final NaOH/Al$_2$(SO$_4$)$_3$ ratio at the point of neutrality, the amount of reactive alumina species available to react with subsequently added silicate is modulated. The requirement of vigorous stirring to maintain a slurry arises because of the tendency of the mixture to form an intractable mass. The rate of addition and stirring must be selected to avoid this difficulty.

The preparation continues by adding a metal-silica source to the hydroxide-aluminum suspension. Great flexibility in the amounts of reagents is possible. The breadth of molar concentration ratios in the final reaction mixture is apparent from column A of Table D. In column B are shown more preferred ratios, and in column C are contained in the particularly preferred ratios that have been developed using aluminum sulfate, sodium hydroxide and sodium silicate in the practice of this invention.

TABLE D

Molar Ratios of Reactants in the Mixture Digested to Prepare Zeolite LZ-202

| | A Composition Ratios | B Preferred Ratios | C Particularly Preferred Ratios |
|---|---|---|---|
| $\frac{SiO_2}{Al_2O_3}$ | 5–30 | 6–10 | 8.0–8.2 |
| $\frac{Na_2O}{SiO_2}$ | 0.03–1 | 0.2–0.5 | 0.30–0.34 |
| $\frac{H_2O}{Na_2O}$ | 10–1000 | 30–100 | 55–75 |
| $\frac{Na_2SO_4}{Al_2O_3}$ | 3.0 ± 0.2 | 3.0 ± 0.2 | 3.0 ± 0.2 |

The stoichiometric ratios in the final reaction composition, in terms of moles of oxides and sulfate, may be expressed as follows:

Broadest Compositional Range: Al$_2$O$_3$: 5–30 SiO$_2$: 1–5 Na$_2$O: 3–20 Na$_2$SO$_4$: 50–1000 H$_2$O Preferred Compositional Range: Al$_2$O$_3$: 6–10 SiO$_2$: 2–3 Na$_2$O: 3–5 Na$_2$SO$_4$: 100–200 H$_2$O A Particularly Preferred Composition: Al$_2$O$_3$: 8.0–8.2 SiO$_2$: 2.4–2.7 Na$_2$O: 3.0 Na$_2$SO$_4$: 150–170 H$_2$O.

The preferred reaction sequence may be detailed as follows. A solution of alkali metal hydroxide is placed in a reaction vessel and vigorously mixed while a solution of aluminum salt, preferably an aluminum sulfate, is added dropwise at a rate of 0.1–0.2 ml/sec; the rate may have to be adjusted if the slurry becomes so thick as to interfere with stirring. After addition is complete the slurry is further mixed for about 5–10 minutes. A metal-silica source is then added to form a dilute suspension. This additive may take the form of silica gel, silica acid, aqueous colloidal silica (available under such trade names as "Nalcoag," "Ludox," "Syton," and "Mertone"), or amorphous solid silica (available commercially, for example, as "Hi-Sil," "Cab-o-sil," "Zeosyl," "QUSO" and "Arc Silica") blended with alkali metal hydroxide to achieve the desired M$_2$O:Al$_2$O$_3$ ratio of about 1.5 to about 4, and preferably about 2.4 to 2.7. Alternatively an alkali metal silicate containing from about 15 to about 40 percent SiO$_2$ and from about 5 to about 15 percent M$_2$O may be used. Preferred is sodium silicate containing from about 25 to about 35, and preferably from about 28 to about 32, percent by weight SiO$_2$ and from about 6 to about 12, and preferably from about 8 to about 10, percent by weight Na$_2$O. If the SiO$_2$ level deviates substantially from the preferred range, the Na$_2$O level must be adjusted so that the Na$_2$O/Al$_2$O$_3$ molar ratio falls within the preferred compositional range as described hereinabove.

The suspension that results from the addition of the metal-silica source may optionally be aged for about 16 to about 30 hours at temperatures of 0° C. to about 50° C. Aging may be done quiescently or with agitation.

In the absence of agitation or promoter (defined hereinbelow), the preparation of zeolite LZ-202 is completed by digesting the suspension at elevated temperatures ranging from about 70° C. to about 110° C., and preferably from about 90° C. to about 110° C. Under these conditions the formation of LZ-202 typically requires from about 15 to about 25 days. The extent of conversion is determined by periodically withdrawing samples of the reaction mixture, washing and drying the product and recording an X-ray diffraction pattern for it.

The crystallization process can be significantly accelerated by adding a promoter to the system. As used herein the term "promoter" includes any material that provides centers around which zeolite crystals can grow. A promoter may take the form of fine crystals (i.e. seed crystals) of an omega-type zeolite or a precursor suspension of an omega-type zeolite, i.e., a reaction mixture from which omega-type crystals could be grown if it were completely crystallized. Possible solid crystalline promoters include zeolite omega and zeolite ZSM-4 in their calcined or uncalcined forms and zelote LZ-202. Useful promoters of the suspension type include partially aged or digested mixtures of zeolites omega, ZSM-4 and LZ-202. If the reactivity of a particular suspension is too low to promote crystallization of zeolite LZ-202, further digestion of the promoter will often improve its ability to accelerate that process.

A solid promoter material may theoretically be added at any point prior to digestion in the preparation of zeolite LZ-202. It may be mixed with any of the reactants (the aluminum salt, the MOH or the metal-silica source) in their dryer or wet forms or it may be added to the slurry formed after adding the aluminum salt to the hydroxide or to the suspension formed after the metal-silica source is added. The preferred point of addition, however, is immediately prior to digestion. The crystals may range in size from about 0.2 to about 4 microns, although crystallization is usually more rapid with smaller crystals. If the promoter is of the suspension type, it may be added at any point after formation of the aluminum sulfate-sodium hydroxide slurry and before digestion. Again, however, addition at the commencement of digestion is preferred.

Although great variation in an amount of promoter added is possible, ranging in value from 0.05 to about 99 percent of the weight of the overall reaction mixture, practical considerations dictate a preferred range of from about 0.1% to about 15% by weight of the reaction mixture. Especially satisfactory results have been obtained using seed crystals whose weight is about two percent to about six percent of the weight of the reaction mixture when the metal-silica source is sodium silicate. If a suspension-type promoter is used, its weight, including that of the liquid phase, should typically be about five percent to about ten percent of the weight of the reaction mixture.

Crystalline LZ-202 can be obtained at digestion temperatures of about 70° C. to 200° C. in the presence of a promoter. Higher temperatures generally increase the crystallization rate. When small crystals are used, crystallization is usually complete within one to five days if the digestion is conducted in the preferred temperature range of about 90° C. to about 150° C. Shorter times are generally observed if the digestion mixture is stirred.

The crystalline product is recovered by filtering off the mother liquor, which may be recycled for further crystallizations after enrichment with the proper reactants to the desired stoichiometric ratios. The solid is washed, usually in a filter apparatus, with distilled or deionized water until the effluent wash has a pH of between 9 and 12. The crystals generally range in size from 0.2 to several microns.

The crystals are dried, conveniently in an oven, at a temperature of from about 25° C. to about 150° C. In the dried form they usually contain from about 14 to about 18 percent by weight water. Unlike the zeolite omega and zeolite ZSM-4 counterparts, the crystals of zeolite LZ-202 may be completely ion-exchanged at this point; there is no need for calcination or oxidation to remove organic template ions. Ion-exchange with ammonium ion and other ions from the alkali metal, alkaline earth, transition metal and rare earth families is readily accomplished by techniques well known in the art. The ammonium form may be deammoniated by the thermal treatment between about 350° C. and about 600° C. according to the procedure described in U.S. Pat. No. 3,130,006.

The proton form of zeolite LZ-202, prepared either by ion-exchange or deammoniation, is an effective catalyst in various hydrocarbon conversion processes such as cracking, hydrocracking, isomerization, polymerization, hydrogenation, reforming and paraffin alkylation. When the alkylation reaction between benzene and propylene is conducted using zeolite LZ-202 catalyst under the conditions described in U.S. Pat. No. 4,241,036, the rate of benzene alkylation is comparable to that observed when the catalyst is hydrogen omega, i.e. zeolite omega that has been ammonium-exchanged in its as-synthesized form and then calcined.

Anhydrous zeolite LZ-202 may be prepared for use as a drying agent by dehydrating the as-synthesized crystals at temperatures of from about 25° C. to 550° C., or at lower temperatures in vacuo.

Zeolite LZ-202 adsorbs from about 13 to about 18 percent by weight oxygen at −183° C. and 100 torr. It also adsorbs neopentane to the extent of about 2 to about 5 percent by weight at 25° C. and 400 torr. These data demonstrate the good adsorptive properties of the zeolite and that the main pore aperture is at least 6.2 Angstroms.

The following examples are given to illustrate the practice of this invention. They are not intended to limit the scope of the appended claims in any way. In these examples the following definitions apply. "Calcined omega" is zeolite omega prepared using a template method and then calcined to destroy the residual template cation. "H+ omega" refers to zeolite omega that has been ammonium-exchanged in its as-synthesized form and then calcined to destroy template cations and ammonium cations to prepare the proton form of the zeolite.

EXAMPLE 1

This example presents a general procedure for making the LZ-202 omega-type zeolite by the process of this invention.

A solution of 66.6 g $Al_2(SO_4)_3 \cdot 18H_2O$ in 96.1 g $H_2O$ was slowly added to a vigorously stirred solution of 24.5 g of 98% NaOH in 50.0 g $H_2O$ to form a slurry. After additional stirring to assure complete suspension of solids, sodium silicate (173.6 g, 40 Grade, 28.2% $SiO_2$, 9.0% $Na_2O$) was added and the resulting suspension was stirred vigorously. The overall composition, in terms of moles of oxides, was as follows:

$Al_2O_3$: 8.15 $SiO_2$: 2.52 $Na_2O$: 3.0 $Na_2SO_4$: 160 $H_2O$.

The mixture was transferred to a Teflon container, sealed and aged for 24 hours at room temperature. It was then heated to 100° C. for 20 days. The mother liquor was filtered from the crystalline product which was then washed and dried. The X-ray diffraction pattern (Table E) was characteristic of an omega-type zeolite. The composition of the dried product, in terms of moles of oxides, was $Al_2O_3$: 0.98 $Na_2O$: 5.79 $SiO_2$: 5.37 $H_2O$

TABLE E

| X-Ray Diffraction Pattern for LZ-202 Prepared in Example 1 | |
|---|---|
| d(A) | Relative Intensity |
| 15.54 | 13.3 |
| 9.06 | 100.0 |
| 7.83 | 21.0 |
| 6.81 | 56.6 |
| 5.93 | 22.7 |
| 5.47 | 14.2 |
| 4.68 | 13.4 |
| 3.79 | 51.4 |
| 3.70 | 27.5 |
| 3.61 | 20.4 |
| 3.51 | 65.4 |
| 3.44 | 13.6 |
| 3.15 | 63.0 |
| 3.08 | 19.7 |
| 3.04 | 11.7 |
| 3.02 | 16.4 |
| 2.98 | 11.6 |
| 2.91 | 61.5 |

EXAMPLE 2

This example demonstrates the preparation of zeolite LZ-202 using seed crystals of calcined omega as a promoter, a digestion temperature of 100° C. and quiescent digestion.

A solution of 399.8 g $Al_2(SO_4)_3 \cdot 18H_2O$ in 450.0 g $H_2O$ was added dropwise to a vigorously mixed solution of 145.9 g 98% NaOH in 427.2 g $H_2O$. After additional stirring 1042.17 g sodium silicate (40 Grade, 28.7% $SiO_2$, 9.1% $Na_2O$) was added to the slurry and blended until a homogeneous suspension was obtained.

The overall reaction composition in terms of moles of oxide was:

Al$_2$O$_3$: 8.15 SiO$_2$: 2.5 Na$_2$O: 3.0 Na$_2$SO$_4$: 160 H$_2$O.

To this suspension were added 123.2 g of calcined zeolite omega seed crystals.

One half of the resulting suspension was quiescently digested in a sealed Teflon container at a temperature of 100° C. After 67 hours of digestion, the product was highly crystalline zeolite LZ-202. The X-ray diffraction pattern of the product is shown in Table F. The product recovered after filtration and drying had a composition in terms of moles of oxide, as follows:

Al$_2$O$_3$: Na$_2$O: 6.3 SiO$_2$: 5.8 H$_2$O

Oxygen adsorption at −183° C., 100 torr was 17.33 weight percent; neopentane adsorption at 25° C., 400 torr was 3.13 weight percent.

TABLE F

| \ | X-Ray Diffraction Pattern of LZ-202 Prepared in Example 2 |
| --- | --- |
| d(A) | Relative Intensity |
| 15.92 | 11.7 |
| 9.15 | 100.0 |
| 7.93 | 16.3 |
| 6.87 | 48.9 |
| 5.97 | 30.7 |
| 5.49 | 16.3 |
| 4.71 | 15.3 |
| 3.94 | 10.4 |
| 3.80 | 60.2 |
| 3.71 | 31.7 |
| 3.61 | 27.4 |
| 3.52 | 67.4 |
| 3.44 | 18.9 |
| 3.16 | 56.0 |
| 3.09 | 25.7 |
| 3.03 | 23.9 |
| 2.98 | 14.0 |
| 2.92 | 65.9 |

EXAMPLE 3

This experiment demonstrates that LZ-202 can be easily prepared at a digestion temperature of 150° C. using seed crystals of calcined omega as a promoter and stirred digestion.

The remaining half of the seed mixture of Example 2 was transferred to a stainless steel reactor and heated, under seal, to 150° C. at 300 rpm agitation. After 26 hours highly crystalline LZ-202 was recovered by filtration, washing and drying. The crystals were generally large; many were 2.5–3 microns in size. The more significant interplanar spacings characteristic of zeolite LZ-202 were analogous to those in Table F. Its composition, in terms of moles of oxides, were as follows:

Al$_2$O$_3$: Na$_2$O: 6.5 SiO$_2$: 5.8 H$_2$O

Oxygen adsorption at −183° C., 100 torr was 15.2 weight percent and neopentane adsorption at 25° C., 400 torr was 2.4 weight percent.

EXAMPLE 4

This example shows that zeolite LZ-202 can be crystallized in 24 hours at 100° C. if the digestion mixture is seeded and stirred.

A solution containing 133.3 g Al$_2$(SO$_4$)$_3$.18H$_2$O in 150.0 g H$_2$O was added dropwise to a vigorously stirred solution of 48.6 g NaOH in 142.4 g H$_2$O. The resulting slurry was further stirred several minutes before 347.4 g sodium silicate (40 Grade, 28.2% SiO$_2$, 9.0% Na$_2$O) and 41.1 g H+ omega were added. The composition of this mixture was identical to those of previous examples.

The mixture was digested in a glass round-bottom flask at 100° C. with vigorous mechanical stirring. The product recovered by filtration and drying after 24 hours of digestion exhibited an X-ray diffraction pattern characteristic of zeolite LZ-202. Its oxygen adsorption was 16.8 weight percent at −183° C., 100 torr, and neopentane adsorption was 3.7 weight percent at 25° C., 400 torr.

EXAMPLE 5

This example illustrates the use of seed crystals of H+ omega as a promoter in the preparation of zeolite LZ-202.

A solution of 133.3 g Al$_2$(SO$_4$)$_3$.18H$_2$O in 150.0 g H$_2$O was added dropwise to a vigorously stirred solution of 48.6 g of 98% NaOH in 142.4 g H$_2$O. The resulting slurry was stirred for several minutes before 347.4 g sodium silicate (40 Grade, 28.7% SiO$_2$, 9.1% Na$_2$O) were added slowly with stirring. Seed crystals, 41.1 g of H+ omega were added and blended into the final slurry.

The slurry was sealed in a 250 ml Teflon container and digested quiescently at 100° C. After 47 hours the product was substantially zeolite LZ-202.

EXAMPLE 6

This synthesis demonstrates the preparation of zeolite LZ-202 using large seed crystals of zeolite LX-202 as a promoter and stirred digestion.

To a vigorously stirred solution of 109.4 g 98% NaOH in 320.4 g H$_2$O was added dropwise a solution of 299.9 g Al$_2$(SO$_4$)$_3$.18H$_2$O in 337.5 g H$_2$O. The resulting slurry was stirred while 781.6 g sodium silicate (40 Grade, 28.7% SiO$_2$, 9.1% Na$_2$O) was added. To the resulting suspension were added 92.4 g of large-crystal LZ-202 prepared in example 3. The mixture was heated to reflux and digested with stirring for 4 days. X-ray diffraction patterns of the product were recorded periodically. After 95 hours the product was LZ-202 with a trace of zeolite P.

EXAMPLE 7

This experiment illustrates a procedure for a larger scale preparation of zeolite LZ-202 using seed crystals of calcined omega and stirred digestion.

Three separate batches, each containing 599.8 g Al$_2$(SO$_4$)$_3$.18H$_2$O dissolved in 660 g H$_2$O were added to three separately prepared and vigorously stirred solutions of 218.8 g NaOH in 655.8 g H$_2$O. The three resulting slurries were combined into a 12-liter round-bottom flask equipped with a mechanical stirrer. The larger slurry was stirred while 4,689.8 g sodium silicate (31.8% SiO$_2$, 11.3% Na$_2$O) were mixed in. To the resulting suspension were added 554.6 g calcined omega seed crystals. Digestion was carried out under reflux conditions for about 5 days. The crystalline product (approximately 1.17 kg, including the seed crystals) was separated from the mother liquor using a large filter and washed with water until the effluent pH was about 10. It was dried at room temperature by pulling air through the filter cake. The composition of the product was as follows:

Al$_2$O$_3$: Na$_2$O: 6.6 SiO$_2$: 5.5 H$_2$O.

The X-ray diffraction pattern was typical of a crystalline omega-type zeolite.

EXAMPLE 8

This example illustrates a second scaled-up LZ-202 synthesis wherein the calcined omega seed crystal additive was halved from that used in earlier experiments. Complete crystallization was accomplished in 16 hours at 125° C. in an agitated system.

A solution containing 51.42 pounds of Al$_2$(SO$_4$)$_3$·18-H$_2$O dissolved in 79.1 pounds of H$_2$O was added slowly into a stirred solution of 18.95 pounds of NaOH dissolved in 37.9 pounds of H$_2$O. The resulting slurry waa stirred for 2 hours to insure homogeneity. Following this homogenization step, 129.39 pounds of sodium silicate (29.2% SiO$_2$, 9.1% Na$_2$O) were added to and mixed with this slurry. Seed crystals of calcined zeolite omega (7.92 pounds, representing 2.5% by weight of the total gel) were added and mixed for 1 hour. The gel composition for this scaled-up synthesis was the same as that used in the other examples.

Digestion was carried out in a 30 gallon stainless steel reactor at 125° C. Vigorous agitation was maintained throughout the 16 hours required to produce a fully crystalline LZ-202 product. The crystalline product (approximately 25 pounds) was recovered by filtration and washing on a filter press and dried at room temperature and then at 100° C.

The X-ray diffraction pattern of this product was typical of a well crystallized LZ-202 material. It's oxygen absorption capacity was 14.33 weight percent at −183° C., 100 torr.

What is claimed is:

1. A crystalline omega-type synthetic zeolitic molecular sieve, denominated LZ-202,
   (a) whose stoichiometric composition expressed in moles of oxide is

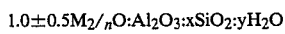
   $$1.0\pm0.5M_{2/n}O:Al_2O_3:xSiO_2:yH_2O$$

wherein M represents at least one hydrogen, ammonium, alkali metal, alkaline earth, transition metal or rare earth lanthanide metal cation in oxidation state n, x has a value of from about 3 to about 20, and y has a value of from zero to about 20;
   (b) having an X-ray diffraction pattern characteristic of an omega-type zeolite;
   (c) whose fluorosilicate substitution product is more crystalline than that prepared from a calcined or oxidized omega-type zeolite synthesized using an organic template cation.

2. The crystalline zeolitic molecular sieve of claim 1 wherein M is sodium, hydrogen, ammonium or potassium.

3. The crystalline zeolitic molecular sieve of claim 1 wherein x is from about 5 to about 10 and y is from 0 to 10.

4. A molecular sieve according to claim 1 wherein said fluorosilicate substitution product is more than 30% crystalline relative to calcined, then ammonium-exchanged zeolite omega.

5. A molecular sieve according to claim 4 wherein said fluorosilicate product is at least 75% crystalline.

6. An organic template-free method of preparing LZ-202 which comprises:
   (a) combining, with sufficient agitation to maintain an organic template-free slurry,
      (i) an aqueous solution of an aluminum salt containing the anion of a strong acid, and
      (ii) an aqueous solution of MOH of sufficient concentration and amount to neutralize said aluminum salt, wherein MOH is an alkali metal hydroxide;
   (b) blending with said organic template-free slurry of step (a) a silica source containing silica in a molar amount that is about 5 to about 30 times that of alumina and an alkali metal source in a molar amount that is about 1 to about 12 times that of alumina; and
   (c) digesting the mixture of step (b) for a time and at a temperature sufficient to produce a crystalline material having an X-ray diffraction pattern characteristic of omega-type zeolites.

7. A method according to claim 6 wherein said solution of aluminum salt is added to said solution of MOH.

8. A method according to claim 6 wherein said aluminum salt is an aluminum sulfate.

9. A method according to claim 6 wherein M is sodium.

10. A method according to claim 6 where said metal-silica source contains silica in a molar amount that is about 6 to about 10 times that of alumina added in step a.

11. A method according to claim 6 wherein said metal-silica source contains silica in a molar amount that is about 8.0 to about 8.2 times that of alumina added in step a.

12. A method according to claim 6 wherein said metal-silica source contains alkali metal in a molar amount that is about 1.5 to about 4 times that of alumina added in step a.

13. A method according to claim 6 wherein said metal-silica source contains alkali metal in a molar amount that is about 2.4 to about 2.7 times that of the alumina added in step a.

14. A method according to claim 6 wherein said metal-silica source is an alkali metal silicate containing from about 15 to about 40 percent by weight SiO$_2$ and from about 5 about 15 percent by weight M$_2$O.

15. A method according to claim 14 wherein said metal-silica source is sodium silicate containing from about 25 to about 35% by weight SiO$_2$ and from about 6 to about 12% by weight Na$_2$O.

16. A method according to claim 14 wherein said sodium silicate contains from about 28 to about 32 percent by weight SiO$_2$ and from about 8 to about 10 percent by weight Na$_2$O.

17. A method according to claim 6 which further comprises aging the product of step b for about 10 to about 30 hours at a temperature of from about 0° C. to about 50° C. prior to digestion.

18. A method according to claim 6 which further comprises mixing a promoter with the aluminum salt solution, the MOH solution or the alkali metal and silica sources or with the products of either step (a) or step (b), wherein said promoter provides centers around which zeolite LZ-202 can grow.

19. A method according to claim 18 wherein said promoter is a powder containing fine crystals of an omega-type zeolite or a partially digested precursor suspension for an omega-type zeolite.

20. A method according to claim 18 wherein said promoter is LZ-202, calcined or uncalcined zeolite omega or calcined or uncalcined zeolite ZSM-4.

21. A method according to claim 18 wherein the weight of said promoter is about 0.1 to about 15 percent of the weight of the reaction mixture when the promoter is a crystalline powder.

22. A method according to claim 18 wherein the weight of said promoter is about two to about six percent of the weight of the reaction mixture when the promoter is a fine crystalline powder and the metal-silica source is sodium silicate.

23. A method of preparing zeolite LZ-202 which comprises:
 a. adding, with sufficient agitation to maintain a slurry, an aqueous solution of aluminum sulfate to an aqueous solution of NaOH of sufficient concentration and molar amount to neutralize said aluminum sulfate;
 b. blending sodium silicate containing from about 25 to about 35, percent by weight $SiO_2$ and from about 6 to about 12 percent by weight $Na_2O$ with the slurry of step a; and
 c. digesting the product of step b at a temperature of from about 70° C. to about 110° C., until a crystalline product having an X-ray diffraction pattern essentially as set forth in Table A is obtained.

24. A method according to claim 23 wherein said sodium silicate contains from about 28 to about 32 percent by weight of $SiO_2$ and from about 8 to about 10 percent by weight of $Na_2O$.

25. A method according to claim 23 wherein the product of step b is digested quiescently at about 90° C. to about 110° C.

26. A method according to claim 23 wherein the composition of the blend resulting in step b is, in terms of moles of oxides and sulfate:
 $Al_2O_3$: 5–30 $SiO_2$: 1–5 $Na_2O$: 3–20 $Na_2SO_4$: 50–1,000 $H_2O$.

27. A method according to claim 26 wherein said composition is
 $Al_2O_3$: 6–12 $SiO_2$: 2–3 $Na_2O$: 3–5 $Na_2SO_4$: 100–200 $H_2O$.

28. A method according to claim 26 wherein said composition is
 $Al_2O_3$: 8.0–8.2 $SiO_2$: 2.4–2.7 $Na_2O$: 3.0 $Na_2SO_4$: 150–170 $H_2O$.

29. A method according to claim 23 which further comprises mixing promoter with said aluminum salt, said MOH or said sodium silicate or with the products of either step a or step b.

30. A method according to claim 29 wherein aid promoter is a powder containing fine crystals of an omega-type zeolite or a precursor suspension for an omega-type zeolite.

31. A method according to claim 30 wherein said promoter is LZ-202, calcined or uncalcined zeolite omega or calcined or uncalcined zeolite ZSM-4.

32. A method according to claim 29 wherein the weight of said promoter is about 0.1 to about 15 percent of the weight of the reaction mixture when the promoter is a crystalline powder.

33. A method according to claim 29 wherein the weight of said promoter is about two to about six percent of the weight of the reaction mixture when the promoter is a fine crystalline powder and the metal-silica source is sodium silicate.

34. A method according to claim 23 wherein said promoter is a precursor suspension for an omega-type zeolite.

35. A method of preparing zeolite LZ-202 which comprises:
 a. adding, with sufficient agitation to maintain a slurry, an aqueous solution of aluminum sulfate to an aqueous solution of NaOH of sufficient concentration and amount to neutralize said aluminum sulfate;
 b. blending sodium silicate containing from about 25 to about 35 percent by weight $SiO_2$ and from about 6 to about 12 percent by weight $Na_2O$ with the slurry of step a;
 c. blending the product of step b with a promoter; and
 d. digesting the product of step c at a temperature of from about 70° C. to about 200° C. until a crystalline product having an X-ray diffraction pattern essentially as set forth in Table A is obtained.

36. A method according to claim 35 wherein said sodium silicate contains from about 28 to about 32 percent by weight $SiO_2$ and from about 8 to about 10 percent by weight $Na_2O$.

37. A method according to claim 35 wherein the digestion is conducted at a temperature of from about 90° C. to about 150° C.

38. A method according to claim 35 wherein the composition of the blend resulting in step b is, in terms of moles of oxides and sulfate:
 $Al_2O_3$: 5–30 $SiO_2$: 1–5 $Na_2O$: 3–20 $Na_2SO_2$: 50–1000 $H_2O$.

39. A method according to claim 38 wherein said composition is
 $Al_2O_3$: 6–12 $SiO_2$: 2–3 $Na_2O$: 3–5 $Na_2SO_4$: 100–200 $H_2O$.

40. A method according to claim 39 wherein said composition is
 $Al_2O_3$: 8.0–8.2 $SiO_2$: 2.4–2.7 $Na_2O$: 3.0 $Na_2SO_4$: 150–170 $H_2O$.

41. A method according to claim 35 wherein said promoter is a powder containing fine crystals of an omega-type zeolite or a precursor suspension for an omega-type zeolite.

42. A method according to claim 35 wherein said promoter is LZ-202, calcined zeolite omega or calcined or uncalcined zeolite ZSM-4.

43. A method according to claim 35 wherein the weight of said promoter is about 0.1 to about 15 percent of the weight of the reaction mixture when the promoter is a crystalline powder.

44. A method according to claim 35 wherein said promoter is precursor suspension for an omega-type zeolite.

45. A method according to claim 35 wherein the weight of said promoter is about two to about six percent by weight of the reaction mixture when the promoter is a fine crystalline powder and the metal-silica source is sodium silicate.

46. A composition prepared by the method of claim 6.

47. A composition prepared by the method of claim 23.

48. A composition prepared by the method of claim 35.

49. The LZ-202 zeolite of claim 1 characterized by the following X-ray diffraction pattern:

| d(A) | Relative Intensity |
| --- | --- |
| 15.54 | M |
| 9.06 | VS |
| 7.83 | M |
| 6.81 | MS |
| 5.93 | M |
| 4.68 | M |
| 3.79 | MS |
| 3.70 | M |
| 3.61 | M |

-continued

| d(A) | Relative Intensity |
|------|--------------------|
| 3.51 | S |
| 3.15 | S |
| 3.08 | M |
| 3.02 | M |
| 2.91 | S |

50. The method for preparing LZ-202 zeolite of claim 6 wherein said crystalline material is characterized by the following X-ray diffraction pattern:

| d(A) | Relative Intensity |
|------|--------------------|
| 15.54 | M |
| 9.06 | VS |
| 7.83 | M |
| 6.81 | MS |
| 5.93 | M |
| 4.68 | M |
| 3.79 | MS |
| 3.70 | M |
| 3.61 | M |
| 3.51 | S |
| 3.15 | S |
| 3.08 | M |
| 3.02 | M |
| 2.91 | S |

* * * * *